United States Patent
Yamada et al.

(10) Patent No.: US 9,163,722 B2
(45) Date of Patent: Oct. 20, 2015

(54) HYDRAULIC CONTROL DEVICE, CONTROL METHOD OF THEREOF, AND AUTOMATIC TRANSMISSION

(75) Inventors: Naohiro Yamada, Atsugi (JP); Keichi Tatewaki, Atsugi (JP); Shinichiro Watanabe, Yokohama (JP); Noritaka Aoyama, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 881 days.

(21) Appl. No.: 13/218,028

(22) Filed: Aug. 25, 2011

(65) Prior Publication Data
US 2012/0060486 A1    Mar. 15, 2012

(30) Foreign Application Priority Data
Sep. 10, 2010    (JP) ................. 2010-203466

(51) Int. Cl.
| | |
|---|---|
| F16D 31/02 | (2006.01) |
| F16H 61/662 | (2006.01) |
| F16H 61/00 | (2006.01) |
| F16H 37/02 | (2006.01) |
| F16H 61/70 | (2006.01) |

(52) U.S. Cl.
CPC ...... *F16H 61/66272* (2013.01); *F16H 61/0025* (2013.01); *F16H 37/022* (2013.01); *F16H 61/70* (2013.01); *F16H 2037/023* (2013.01); *F16H 2061/0034* (2013.01); *F16H 2312/14* (2013.01)

(58) Field of Classification Search
CPC .......... F16H 61/0025; F16H 61/66272; F16H 61/70; F16H 37/022; F16H 2312/14; F16H 2037/023; F16H 2061/0034
USPC .......... 60/400, 403, 428, 430, 431, 466, 468, 60/441, 435, 438
See application file for complete search history.

(56) References Cited

U.S. PATENT DOCUMENTS

| | | | | |
|---|---|---|---|---|
| 3,570,245 | A * | 3/1971 | Linde | 60/413 |
| 5,020,322 | A * | 6/1991 | Schwarz | 60/404 |
| 7,946,389 | B2 * | 5/2011 | Kakinami et al. | 184/27.2 |
| 2003/0145583 | A1 * | 8/2003 | Tanaka et al. | 60/298 |
| 2004/0016230 | A1 * | 1/2004 | Hale | 60/413 |
| 2005/0064975 | A1 | 3/2005 | Takagi et al. | |
| 2005/0183415 | A1 | 8/2005 | Shimakura | |

(Continued)

FOREIGN PATENT DOCUMENTS

| | | |
|---|---|---|
| DE | 10 2006 014 759 A1 | 10/2007 |
| DE | 10 2007 003 924 A1 | 7/2008 |
| EP | 2 546 552 A1 | 1/2013 |

(Continued)

*Primary Examiner* — Dwayne J White
*Assistant Examiner* — Logan Kraft
(74) *Attorney, Agent, or Firm* — Foley & Lardner LLP

(57) ABSTRACT

A hydraulic control circuit includes an oil pump for generating a hydraulic pressure by being rotated by power of a driving force source, a line pressure oil passage in which at least a line pressure generated by adjusting the hydraulic pressure generated by the oil pump is supplied, a driving force source stopping unit that stops the rotation of the driving force source, and a hydraulic pressure reduction suppressing unit that is provided in the line pressure oil passage and suppresses a reduction of the line pressure accompanying reverse rotation of the driving force source when the rotation of the driving force source is stopped by the driving force source stopping unit.

8 Claims, 12 Drawing Sheets

(56) References Cited

U.S. PATENT DOCUMENTS

| | | |
|---|---|---|
| 2008/0308355 A1 | 12/2008 | Kakinami et al. |
| 2010/0184562 A1 | 7/2010 | Senda et al. |

FOREIGN PATENT DOCUMENTS

| | | |
|---|---|---|
| JP | 01-135956 A | 5/1989 |
| JP | 08-014076 A | 1/1996 |
| JP | 10-331677 A | 12/1998 |
| JP | 2002-115755 A | 4/2002 |
| JP | 2003-287115 A | 10/2003 |
| JP | 2006-170295 A | 6/2006 |
| JP | 2008-185022 A | 8/2008 |
| JP | 2008-267498 A | 11/2008 |
| JP | 2010-101418 A | 5/2010 |
| JP | 2010-164143 A | 7/2010 |
| WO | WO 2010/073765 A1 | 7/2010 |
| WO | WO 2011/144284 A1 | 11/2011 |

* cited by examiner

HYDRAULIC CONTROL DEVICE, CONTROL METHOD OF THEREOF, AND AUTOMATIC TRANSMISSION

FIELD OF THE INVENTION

The present invention provides a hydraulic control device, a control method and an automatic transmission which suppress a reduction of a hydraulic pressure in a vehicle capable of stopping a driving force source while running.

BACKGROUND OF THE INVENTION

An idle stop control is known which stops an engine as a driving force source while a vehicle is in a stopped state. A control to stop an engine when a predetermined condition holds also while a vehicle is running is disclosed in JP2010-164143A. Fuel economy of the engine can be improved by such a control.

SUMMARY OF THE INVENTION

A shift of a transmission is controlled using a hydraulic pressure (line pressure) generated by an oil pump driven by an engine as a source pressure. For example, in a stepped transmission mechanism, rotation is transmitted by controlling engaged and released states of frictional engagement elements by a hydraulic pressure. Further, in a continuously variable transmission mechanism, rotation is transmitted by clamping a belt mounted on pulleys by a hydraulic pressure.

In such a transmission, the oil pump driven by the engine stops when the engine stops while the vehicle is running. Thus, the supply of the hydraulic pressure to the frictional engagement elements and the pulleys is stopped. However, the hydraulic pressure does not immediately decrease in an oil passage for supplying the hydraulic pressure from the oil pump to the frictional engagement elements and the pulleys and an engaging force of the frictional engagement element and a belt clamping force can be ensured for a predetermined time after the start of the stopped state of the engine. Thus, the engine can be stopped for the predetermined time before vehicle speed becomes zero.

However, when the engine stops, it may temporarily rotate in a reverse direction due to a compression reaction force of a cylinder. Since this causes the oil pump to rotate in a reverse direction, the hydraulic pressure in the oil passage is sucked into the oil pump and the hydraulic pressure in the oil passage suddenly decreases.

Since the engaging force and the clamping force of the frictional engagement element and the belt of the transmission suddenly decrease due to a sudden decrease of the hydraulic pressure in the oil passage, the predetermined time during which the engaging force of the frictional engagement element and the belt clamping force are ensured from the start of the stopped state of the engine becomes very short. Thus, a time during which the engine can be stopped is shortened, thereby causing a problem of being unable to improve fuel economy.

The present invention was developed in view of such a problem and aims to provide a hydraulic control device which suppresses a reduction of a hydraulic pressure to maintain a shifting state of a transmission when a driving force source stops in a vehicle capable of stopping the driving force source while running.

A hydraulic control device according to an aspect of this invention includes an oil pump for generating a hydraulic pressure by being rotated by power of a driving force source; a line pressure oil passage in which at least a line pressure generated by adjusting the hydraulic pressure generated by the oil pump is supplied; a driving force source stopping unit that stops the rotation of the driving force source; and a hydraulic pressure reduction suppressing unit that is provided in the line pressure oil passage and suppresses a reduction of the line pressure accompanying reverse rotation of the driving force source when the rotation of the driving force source is stopped by the driving force source stopping unit.

A control method according to another aspect of this invention is used to control a hydraulic control device which includes an oil pump for generating a hydraulic pressure by being rotated by power of a driving force source, a line pressure oil passage in which at least a line pressure generated by adjusting the hydraulic pressure generated by the oil pump is supplied, a driving force source stopping unit that stops the rotation of the driving force source, and a hydraulic pressure reduction suppressing unit that is provided in the line pressure oil passage. The method includes suppressing a reduction of the line pressure accompanying reverse rotation of the driving force source when the rotation of the driving force source is stopped by the driving force source stopping unit.

According to these aspects, a reduction of the line pressure is suppressed even if the hydraulic pressure generated by the oil pump is reduced due to the reverse rotation of the driving force source. Thus, it is possible to suppress the shortening of a time during which the driving force source can be stopped and improve fuel economy.

DESCRIPTION OF THE PREFERRED EMBODIMENTS

Hereinafter, embodiments of the present invention are described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

<First Embodiment>

Figure 1:
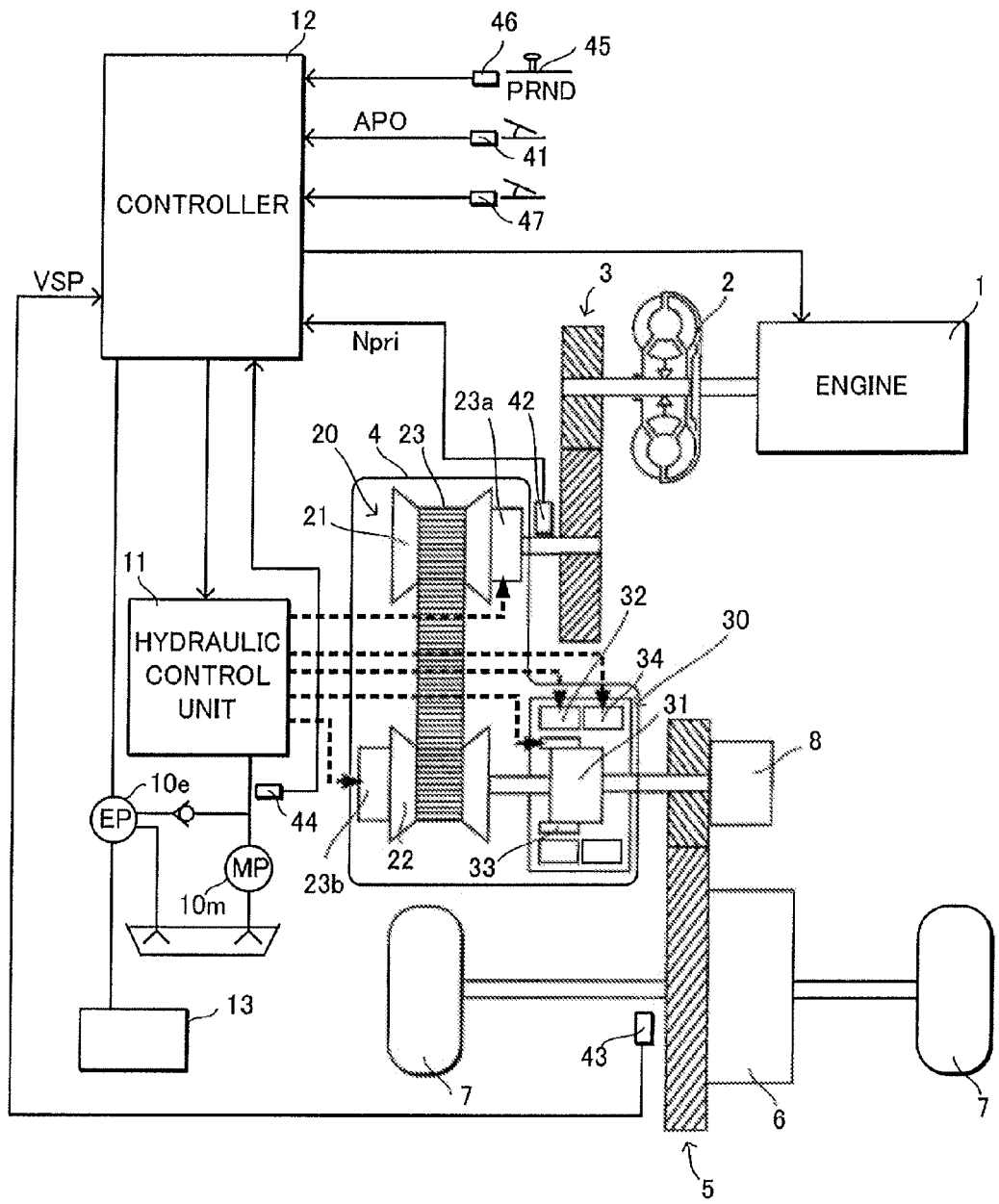
FIG. 1 is a schematic construction diagram of a vehicle including a continuously variable transmission according to a first embodiment.

FIG. 1 is a schematic construction diagram of a vehicle including a continuously variable transmission according to a first embodiment of the present invention. This vehicle includes an engine 1 as a power source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle includes a mechanical oil pump 10m to which the rotation of the engine 1 is input and which is driven by utilizing a part of power of the engine 1 and an electrical oil pump 10e which is driven upon receiving the supply of power from a battery 13. The transmission 4 includes a hydraulic control circuit 11 for adjusting a hydraulic pressure (hereinafter, referred to as a "line pressure") supplied from at least either one of the mechanical oil pump 10m or the electrical oil pump 10e and supplying the adjusted hydraulic pressure to the respective components of the transmission 4, and a controller 12 for controlling the hydraulic control circuit 11.

The transmission 4 includes a continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path. The sub-transmission mechanism 30 may be directly connected to an output shaft of the variator 20 as in this example or may be connected via another transmission or power transmission mechanism (e.g. gear train).

The variator 20 is a belt-type continuously variable transmission including a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the width of the V-groove changes to change contact radii of the V-belt 23 and the respective pulleys 21, 22, whereby a speed ratio vRatio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high brake 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Figure 2:
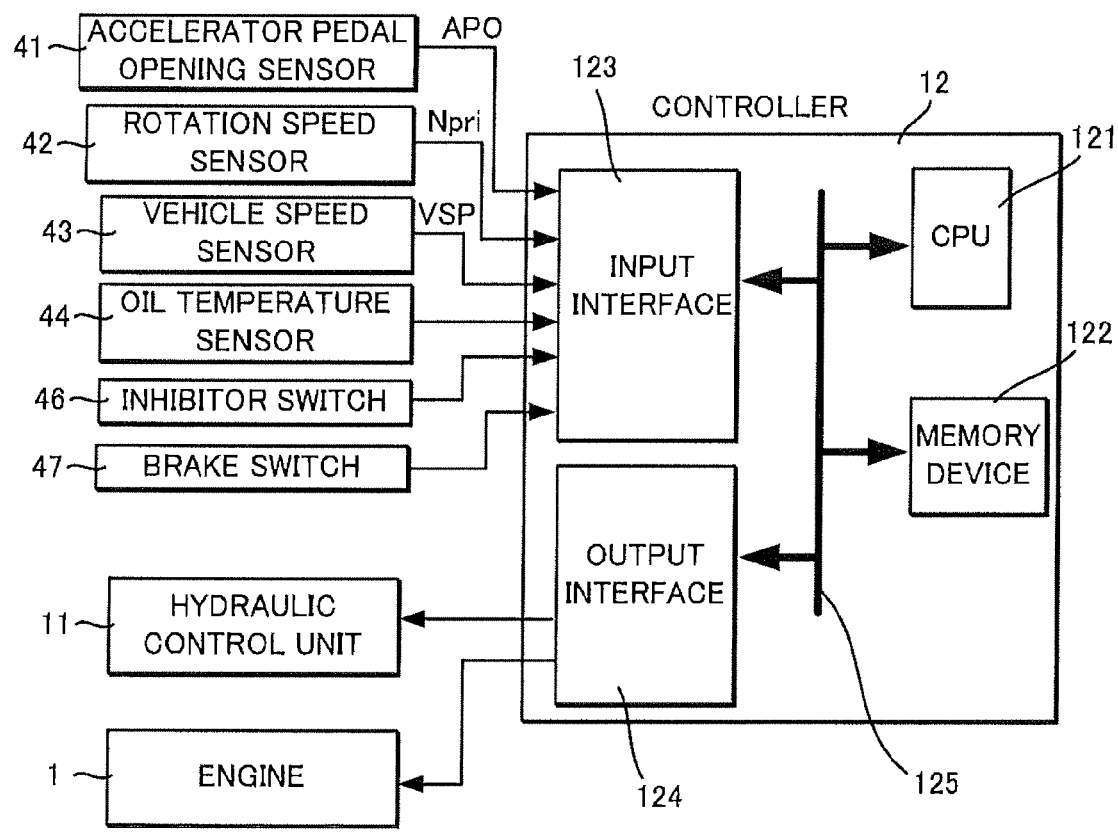
FIG. 2 is a diagram showing an exemplary construction of a transmission controller according to the first embodiment.

The controller 12 is a control unit for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting the opening of an accelerator pedal (hereinafter, referred to as an "accelerator pedal opening APO"), an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a driving speed of the vehicle (hereinafter, referred to as a "vehicle speed VSP"), an output signal of an oil temperature sensor 44 for detecting the oil temperature of the transmission 4, an output signal of an inhibitor switch 46 for detecting the position of a select lever 45, an output signal of a brake switch 47 for detecting depression of a brake pedal, and like output signals.

A control program of the engine 1, a transmission control program of the transmission 4, and a shift map (FIG. 3) used in this transmission control program are stored in the memory device 122. The CPU 121 reads the transmission control program stored in the memory device 122 and implements it, performs various computations on various signals input via the input interface 123 to generate a fuel injection signal, an ignition timing signal, a throttle opening signal and a transmission control signal, and outputs the generated transmission control signal to the hydraulic control circuit 11 via the output interface 124. Various values used in the computations by the CPU 121 and computation results are appropriately stored in the memory device 122.

The hydraulic control circuit 11 includes a plurality of flow passages and a plurality of hydraulic control valves. In accordance with the transmission control signal from the controller 12, the hydraulic control circuit 11 controls the plurality of hydraulic control valves to switch supply paths of the hydraulic pressure, prepares a necessary hydraulic pressure from a hydraulic pressure produced by the oil pump 10m, and supplies this hydraulic pressure to the respective components of the transmission 4. In this way, the speed ratio vRatio of the variator 20 and the gear position of the sub-transmission mechanism 30 are changed to shift the transmission 4.

Figure 3:
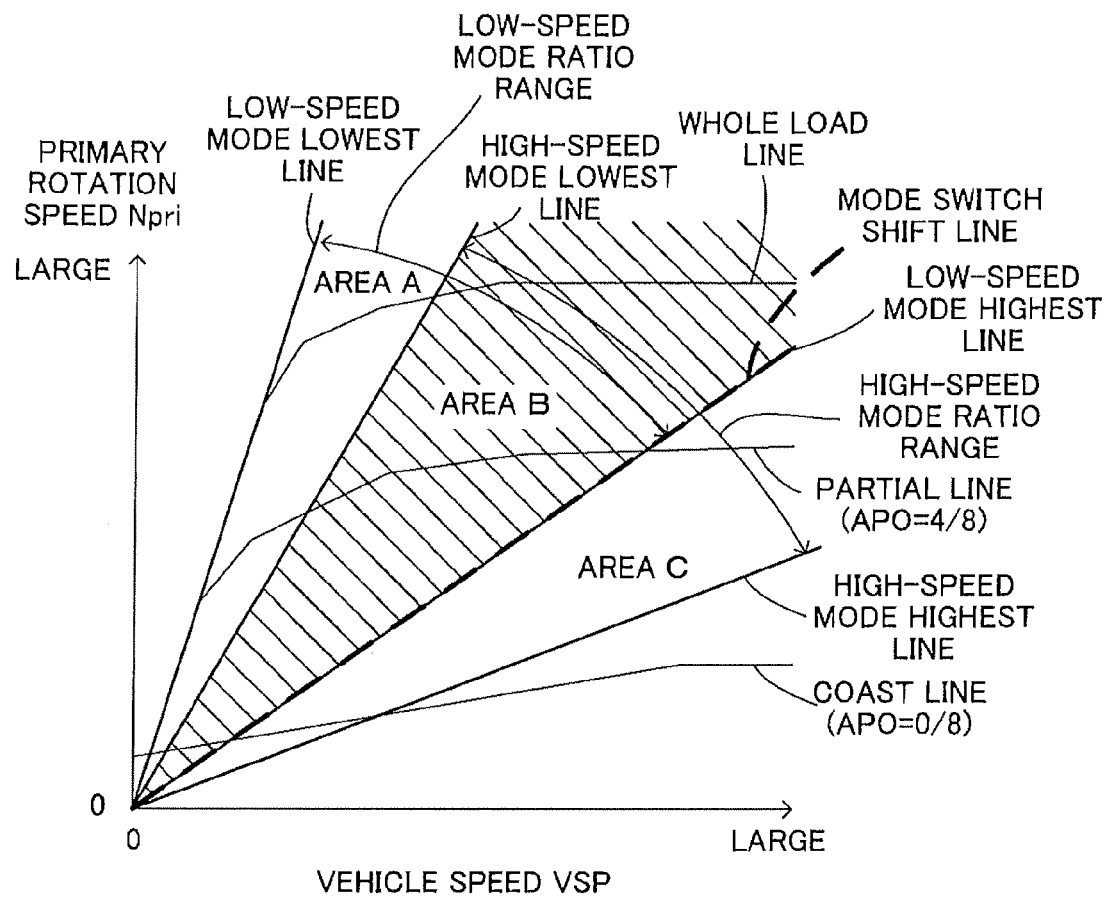
FIG. 3 is a graph showing an example of a shift map according to the first embodiment.

FIG. 3 shows an example of the shift map stored in the memory device 122 of the controller 12 of this embodiment.

On this shift map, an operating point of the transmission 4 is deter mined based on the vehicle speed VSP and the primary rotation speed Npri. The inclination of a line connecting the operating point of the transmission 4 and a zero point at the lower left corner of the shift map indicates the speed ratio of the transmission 4 (overall speed ratio obtained by multiplying the speed ratio vRatio of the variator 20 by a speed ratio subRatio of the sub-transmission mechanism 30, hereinafter, referred to as a "through speed ratio Ratio"). In this shift map, a shift line is set for each accelerator pedal opening APO similar to a shift map of a conventional v-belt continuously variable transmission, and the transmission 4 is shifted in accordance with the shift line selected based on the accelerator pedal opening APO. For simplicity, only a whole load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by maximizing the speed ratio vRatio of the variator 20 and a low-speed mode highest line obtained by minimizing the speed ratio vRatio of the variator 20. At this time, the operating point of the transmission 4 moves in areas A and B. On the other hand, when being in the high-speed mode, the transmission 4 can be shifted between a high-speed mode lowest line obtained by maximizing the speed ratio vRatio of the variator 20 and a high-speed mode highest line obtained by minimizing the speed ratio vRatio of the variator 20. At this time, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a low-speed ratio range which is a range of the through speed ratio Ratio of the transmission 4 that can be set in the low-speed mode and a high-speed mode ratio range which is a range of the through speed ratio Ratio of the transmission 4 that can be set in the high-speed mode partly overlap, and the transmission 4 can be selectively set in either one of the low-speed mode or the high-speed mode if the operating point of the transmission 4 is in the area B defined between the high-speed mode lowest line and the low-speed mode highest line.

The controller 12 sets the through speed ratio Ratio corresponding to the vehicle speed VSP and the accelerator pedal opening APO (driving condition of the vehicle) as a final through speed ratio DRatio by referring to this shift map. This final through speed ratio DRatio is a target value which should be finally reached by the through speed ratio Ratio in this driving condition. Then, the controller 12 sets a target through speed ratio tRatio which is a transient target value for causing the through speed ratio Ratio to follow the final through speed ratio DRatio with desired response characteristics, and controls the variator 20 and the sub-transmission mechanism 30 so that the through speed ratio Ratio coincides with the target through speed ratio tRatio.

On this shift map, a mode switch shift line at which the sub-transmission mechanism 30 is shifted (1-2 shift line of the sub-transmission mechanism 30) is so set as to overlap the low-speed mode highest line. A through speed ratio corresponding to the mode switch shift line (hereinafter, referred to as a "mode switch speed ratio mRatio") is equal to the low-speed mode highest speed ratio.

When the operating point of the transmission 4 crosses the mode switch shift line, i.e. the through speed ratio Ratio of the transmission 4 changes over the mode switch speed ratio mRatio, the controller 12 executes a mode switch shift control. In this mode switch shift control, the controller 12 shifts the sub-transmission mechanism 30 and performs a synchronization shift to change the speed ratio vRatio of the variator 20 in a direction opposite to a changing direction of the speed ratio subRatio of the sub-transmission mechanism 30.

In the synchronization shift, when the through speed ratio Ratio of the transmission 4 changes from a value larger than the mode switch speed ratio mRatio to a value smaller than that, the controller 12 shifts up the gear position of the sub-transmission mechanism 30 from the first gear position to the second gear position (hereinafter, referred to as "1-2 shift") and increases the speed ratio vRatio of the variator 20. Conversely, when the through speed ratio Ratio of the transmission 4 changes from a value smaller than the mode switch speed ratio mRatio to a value larger than that, the controller 12 shifts down the gear position of the sub-transmission mechanism 30 from the second gear position to the first gear position (hereinafter, referred to as "2-1 shift") and decreases the speed ratio vRatio of the variator 20.

The synchronization shift is performed at the time of a mode switch shift to suppress a sense of incongruity given to a driver as the input rotation changes due to a difference in the through speed ratio Ratio of the transmission 4. The mode switch shift is performed when the speed ratio vRatio of the variator 20 is the highest speed ratio because a torque input to the sub-transmission mechanism 30 is the smallest in this state under a torque input to the variator 20 at that time and a shift shock of the sub-transmission mechanism 30 can be alleviated if the sub-transmission mechanism 30 is shifted in this state.

Further, according to this shift map, the speed ratio vRatio of the variator 20 becomes the lowest speed ratio and the gear position of the sub-transmission mechanism 30 becomes the first gear position when the vehicle stops.

The controller 12 of this embodiment executes a coast stop control to stop rotation also while the vehicle is running in addition to an idle stop control to stop rotation while the vehicle is in a stopped state to suppress a fuel consumption amount.

In the coast stop control, the engine 1 is automatically stopped to suppress the fuel consumption amount while the vehicle is running in a low vehicle speed region. Note that the coast stop control is common to a fuel-cut control executed when an accelerator pedal is not depressed in that the supply of fuel to the engine 1 is stopped, but differs therefrom in that the lock-up clutch of the torque converter 2 is released to cut power transmission between the engine 1 and the drive wheels 7 and completely stop the rotation of the engine 1.

Upon executing the coast stop control, the controller 12 first judges, for example, conditions (a) to (d) listed below.
(a): accelerator pedal is not depressed at all (accelerator pedal opening APO=0)
(b): brake pedal is depressed (brake switch 47 is ON)
(c): vehicle speed is a predetermined low speed (e.g. 15 km/h) or lower
(d): lock-up clutch is released.

These conditions are, in other words, conditions to judge whether or not a driver has an intension to stop the vehicle.

The controller 12 stops the supply of fuel to the engine 1 to stop the rotation of the engine 1 when a coast stop condition holds.

Figure 4:
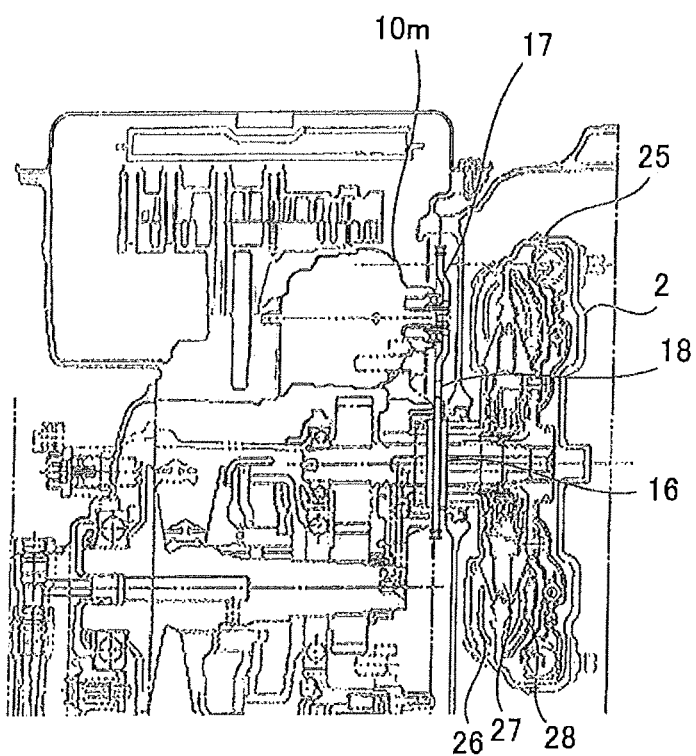
FIG. 4 is a diagram showing the construction of the transmission according to the first embodiment centered on a mechanical oil pump.

FIG. 4 is a diagram showing the construction of the transmission 4 of this embodiment centered on the mechanical oil pump 10m.

Rotation output from the engine 1 rotates a converter housing 25 of the torque converter 2. By this rotation, a pump impeller 26 housed in the converter housing 25 stirs operating oil and rotates a turbine 28 via a stator 27. The turbine 28 is coupled to the first gear train 3, whereby the rotation of the turbine 28 is input to the transmission 4.

The mechanical oil pump 10m is provided near the torque converter 2 and rotated by the rotation of the torque converter 2 to generate a hydraulic pressure.

Sprockets 16, 17 are respectively coupled to the converter housing 25 and the mechanical oil pump 10m, and these sprockets 16, 17 are coupled by a chain 18. The rotation of the converter housing 25 is transmitted to the sprocket 17 via the sprocket 16 and the chain 18.

Since the converter housing 25 is directly coupled to a rotating shaft of the engine 1, the mechanical oil pump 10m constantly rotates while the engine 1 is rotating. Thus, the mechanical oil pump 10m generates a hydraulic pressure necessary for the operation of the transmission 4. This is to constantly generate the hydraulic pressure in a rotating state of the engine 1 since the transmission 4 needs to be controlled by the hydraulic pressure also while the vehicle is in a stopped state.

In this embodiment, the engine 1 is so constructed as to enable an idle stop and a coast stop. When the engine 1 does not rotate, the mechanical oil pump 10m can generate no hydraulic pressure. Accordingly, the electrical oil pump 10e is provided in a hydraulic circuit to generate the hydraulic pressure in idle stop and coast stop states.

The electrical oil pump 10e is driven by the supply of power from the battery 13 under the control of the controller 12 when the supply of the hydraulic pressure to the transmission 4 is necessary while the mechanical oil pump 10m is not operating such as while the rotation of the engine 1 is stopped.

Note that the electrical oil pump 10e operates when a load is relatively low such as at the time of an idle stop or coast stop. Accordingly, the electrical oil pump 10e preferably has a capacity which is sufficient to provide a necessary hydraulic pressure in such a driving condition, but does not lead to a weight increase and a cost increase of the vehicle.

Here, in the case of the coast stop of the engine 1, the engine 1 may temporarily rotate in a reverse direction due to a compression reaction force of a cylinder of the engine as described above.

At this time, since the mechanical oil pump 10m is directly coupled to the rotating shaft of the engine 1, the mechanical oil pump 10m also rotates in a reverse direction when the engine rotates in the reverse direction. When the mechanical oil pump 10m rotates in the reverse direction, the hydraulic pressure generated by the mechanical oil pump 10m becomes negative.

Figure 5:
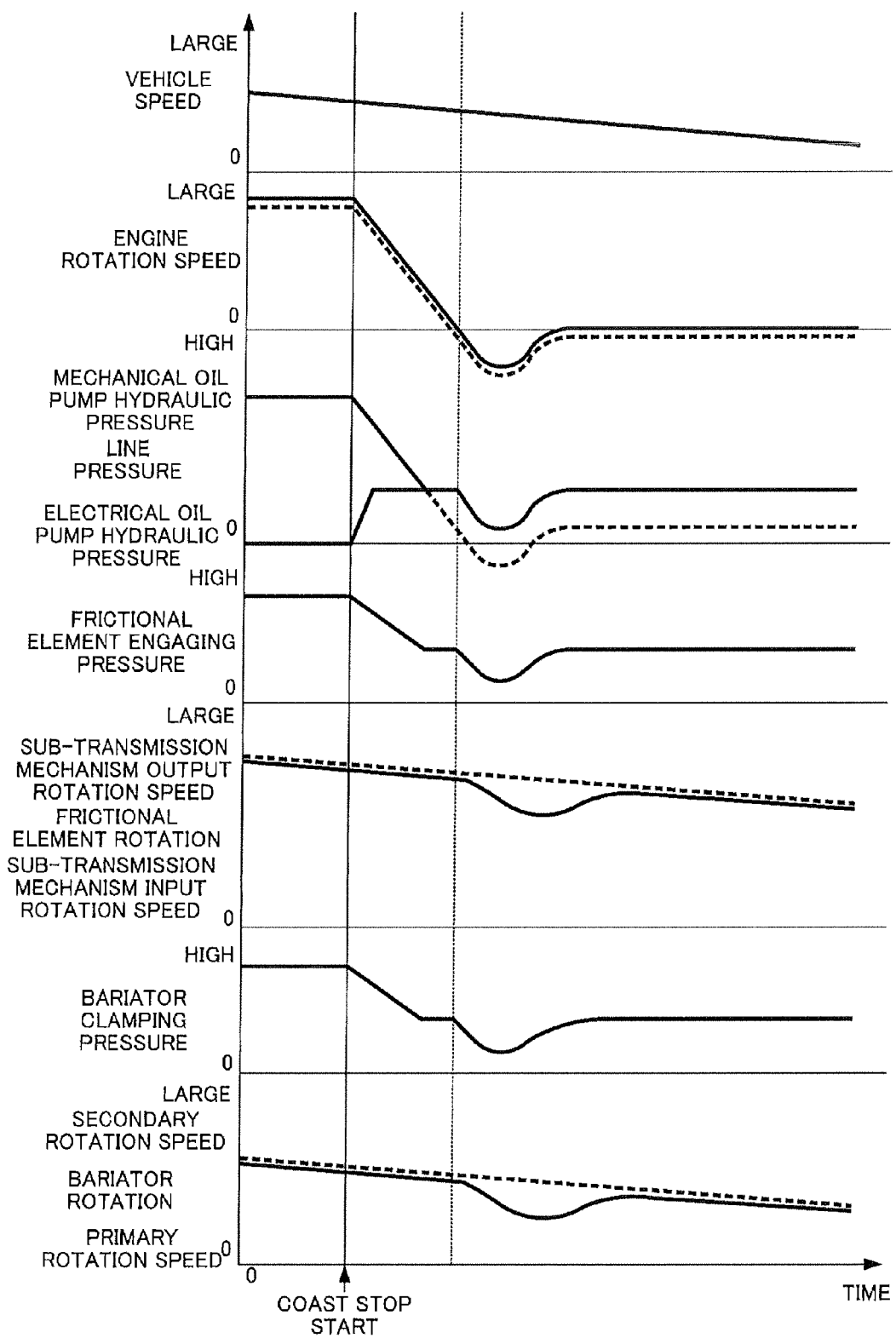
FIG. 5 is a chart of a comparative example showing operations of the transmission at the time of a coast stop in the first embodiment.

FIG. 5 is a chart of a comparative example showing operations of the transmission 4 at the time of a coast stop.

When the driving condition of the vehicle is a coast state and the vehicle speed falls below a predetermined vehicle speed, to the driving condition shifts to a coast stop to release the lock-up clutch of the torque converter 2 and stop the rotation of the engine 1.

By this, the rotation speed of the engine 1 gradually decreases and, eventually, becomes zero. Therefore, the rotation of the mechanical oil pump 10m directly coupled to the rotating shaft of the engine 1 gradually decreases and the hydraulic pressure generated by the mechanical oil pump 10m gradually decreases. Since the hydraulic pressure supplied from the mechanical oil pump 10m to an oil passage 39 does not immediately decrease in this case, the line pressure necessary to engage the frictional engagement element of the transmission 4 and tighten the V-belt 23 of the variator 20 can be ensured for a while.

At this time, the controller 12 activates the electrical oil pump 10e to ensure the line pressure when determining that the engine 1 is to be stopped due to the coast stop. Therefore, the line pressure of the hydraulic control circuit 11 is generated by the electrical oil pump 10e instead of the mechanical oil pump 10m. In the transmission 4, an engaging pressure of the frictional engagement element of the sub-transmission mechanism 30 and a clamping pressure of the V-belt 23 of the variator 20 are controlled using the line pressure generated by the electrical oil pump 10e as a source pressure.

By the coast stop, the rotation speed of the engine 1 becomes zero after gradually decreasing. Immediately before stopping, the engine 1 rotates in the reverse direction due to the compression reaction force of the cylinder. Therefore, the mechanical oil pump 10m directly coupled to the rotating shaft of the engine 1 rotates in the reverse direction.

The mechanical oil pump 10m discharges oil from a discharge side to a suction side by this reverse rotation, thereby generating a negative hydraulic pressure at the discharge side.

When an absolute value of the negative hydraulic pressure generated by the mechanical oil pump 10m exceeds that of the hydraulic pressure generated by the electrical oil pump 10e, the line pressure suddenly decreases.

When the line pressure suddenly decreases, the engaging pressure of the frictional engagement element of the sub-transmission mechanism 30 and the clamping pressure of the V-belt 23 of the variator 20 controlled using the line pressure as the source pressure decrease, wherefore necessary engaging and clamping pressures cannot be ensured.

For example, if the engaging pressure of the frictional engagement element of the sub-transmission mechanism 30 falls below a necessary engaging pressure, there is a possibility that this frictional engagement element slips and is damaged such as by being abraded or fractured.

If the V-belt 23 of the variator 20 slips, there is a possibility of not only deviation of the secondary rotation speed from the primary rotation speed, but also abrasion, fracture or like damage of the V-belt 23 or the pulleys 21, 22 caused by the slip of the V-belt 23.

Against such problems, this embodiment is constructed to suppress a reduction of the hydraulic pressure as described below when the engine 1 rotates in the reverse direction due to the coast stop.

Figure 6:
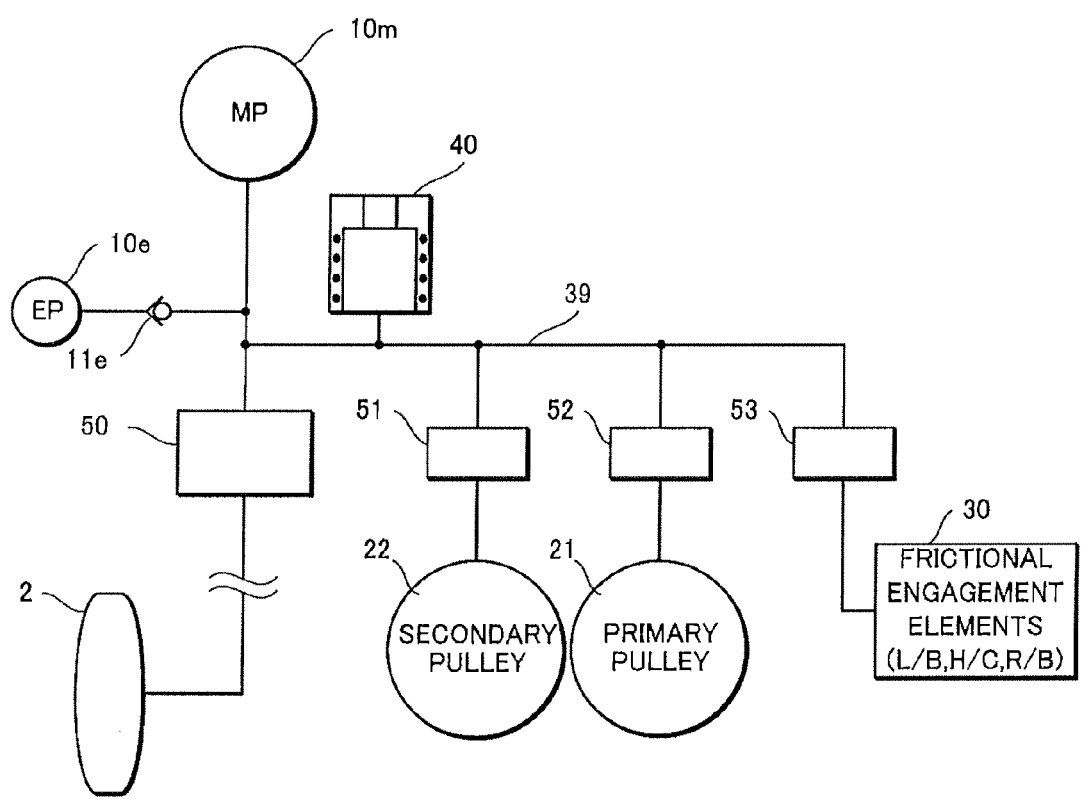
FIG. 6 is a diagram of the first embodiment centered on a hydraulic control circuit.

FIG. 6 is a diagram of this embodiment centered on the hydraulic control circuit 11.

As described above, the mechanical oil pump 10m and the electrical oil pump 10e are connected to the hydraulic control circuit 11 and the hydraulic pressures are supplied thereto.

The hydraulic control circuit 11 includes a line pressure regulator valve 50 to adjust the supplied hydraulic pressure to a predetermined line pressure. The line pressure is supplied to the primary pulley 21, the secondary pulley 22, the frictional engagement elements (low brake 32, high clutch 33, reverse brake 34), the torque converter 2 and the like controlled by the hydraulic pressure.

The line pressure is supplied to the secondary pulley 22 via a pressure reducing valve 51, thereby being controlled to be a suitable hydraulic pressure by the pressure reducing valve 51 and supplied to the hydraulic cylinder 23b.

The line pressure is supplied to the primary pulley 21 via a pressure reducing valve 52, thereby being controlled to be a suitable hydraulic pressure by the pressure reducing valve 52 and supplied to the hydraulic cylinder 23a.

The line pressure is supplied to the sub-transmission mechanism 30 via a pressure reducing valve 53, thereby being controlled to be a suitable hydraulic pressure by the pressure reducing valve 53 and supplied to the frictional engagement elements (low brake 32, high clutch 33, reverse brake 34).

In the hydraulic control circuit 11, an accumulator 40 is provided in the oil passage 39 to prevent the hydraulic pressure supplied from the mechanical oil pump 10m from becoming negative and the line pressure from decreasing due to the reverse rotation of the mechanical oil pump 10*m* caused by the reverse rotation of the engine 1.

The accumulator 40 stores the operating oil inside and pressurizes this operating oil by a spring or gas beforehand.

If the line pressure is an appropriate pressure equal to or above a predetermined pressure, the operating oil is stored in the accumulator 40 by the line pressure.

On the other hand, if the line pressure decreases to fall below the engaging pressure of the frictional engagement element of the sub-transmission mechanism 30 or the V-belt clamping pressure of the variator 20, the operating oil stored in the accumulator 40 is supplied to the hydraulic circuit to prevent a reduction of the hydraulic pressure.

Figure 7:
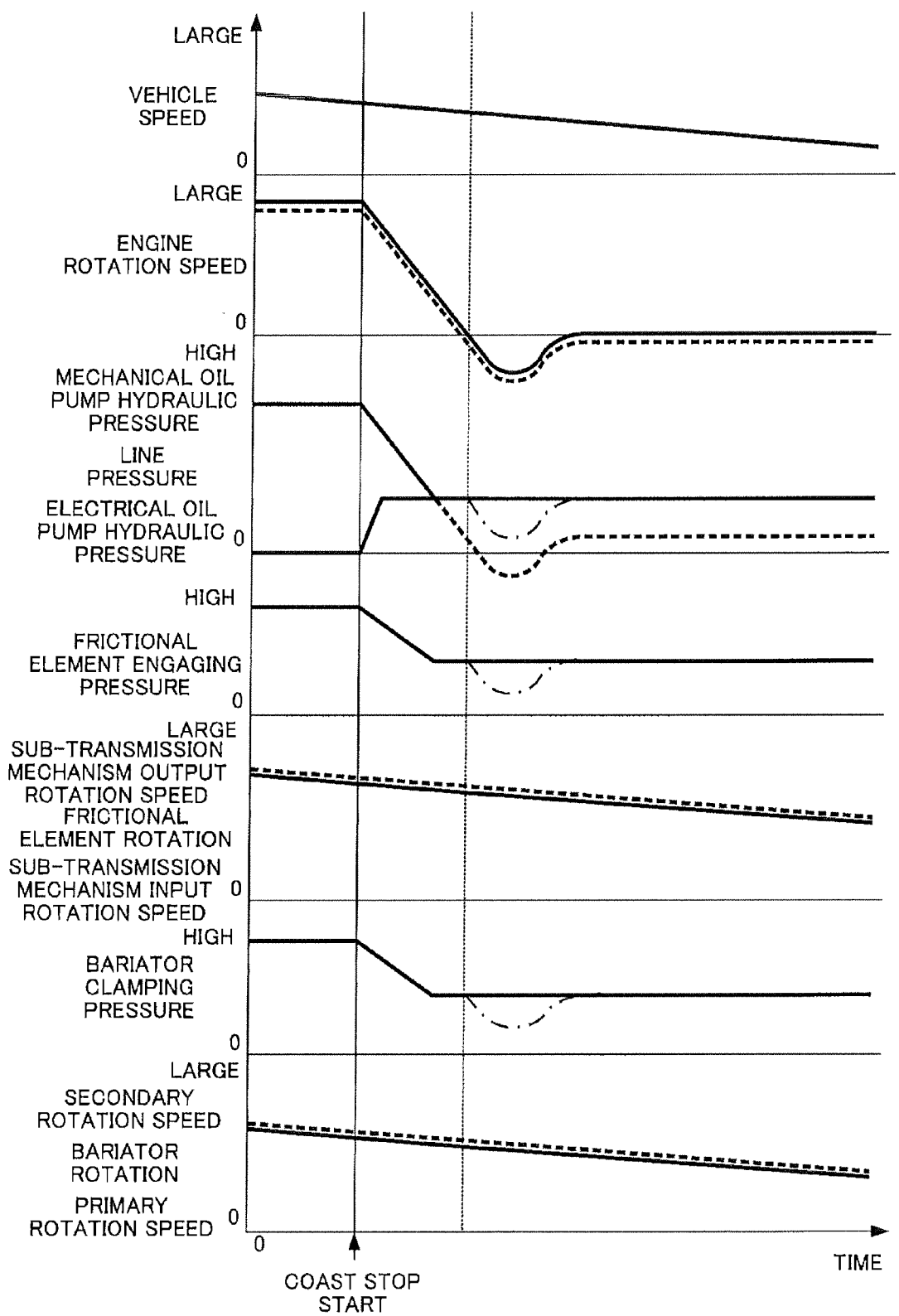
FIG. 7 is a chart showing operations of the transmission at the time of a coast stop according to the first embodiment.

FIG. 7 is a chart showing operations of the transmission 4 at the time of a coast stop in this embodiment.

When the driving condition of the vehicle is a coast state and the vehicle speed falls below a predetermined vehicle speed, the driving condition shifts to a coast stop to release the lock-up clutch of the torque converter 2 and stop the rotation of the engine 1.

By the coast stop, the rotation speed of the engine 1 becomes zero after gradually decreasing. Immediately before stopping, the engine 1 rotates in the reverse direction due to the compression reaction force of the cylinder. Therefore, the mechanical oil pump 10*m* directly coupled to and rotating with the rotating shaft of the engine 1 rotates in the reverse direction, thereby the mechanical oil pump 10*m* generates the negative hydraulic pressure at the discharge side.

Since a reduction of the line pressure caused by the reverse rotation of the mechanical oil pump 10*m* is compensated by the accumulator 40 at this time, the line pressure does not decrease and the engaging pressure of the frictional engagement element of the sub-transmission mechanism 30 and the clamping pressure of the V-belt 23 of the variator 20 are maintained.

A reduction of the line pressure when the engine 1 rotates in the reverse direction due to the coast stop is prevented by such a structure.

As described above, in the first embodiment of the present invention, the accumulator 40 is provided in the oil passage 39 to prevent the hydraulic pressure supplied from the mechanical oil pump 10*m* from becoming negative and the line pressure from decreasing due to the reverse rotation of the mechanical oil pump 10*m* caused by the reverse rotation of the engine 1.

By this, even if the mechanical oil pump 10*m* rotates in the reverse direction due to the reverse rotation of the engine 1 and the hydraulic pressure supplied from the mechanical oil pump 10*m* becomes a negative pressure, a reduction of the line pressure can be prevented by the hydraulic pressure stored in the accumulator 40. This can not only prevent the frictional engagement element of the transmission 4 and the V-belt 23 of the variator 20 from slipping due to a reduction of the engaging pressure of the frictional engagement element and the clamping pressure of the V-belt 23 and a sense of incongruity from being given to a driver such as by an engine runup, but also prevent abrasion and damage of the frictional engagement elements and the variator 20.

<Second Embodiment>

Next, a second embodiment of the present invention is described. The second embodiment is constructed to suppress a reduction of a hydraulic pressure by a check valve 60 instead of the accumulator 40. Note that a basic construction (FIGS. 1 to 5) of the second embodiment is the same as that of the first embodiment and not described.

Figure 8:
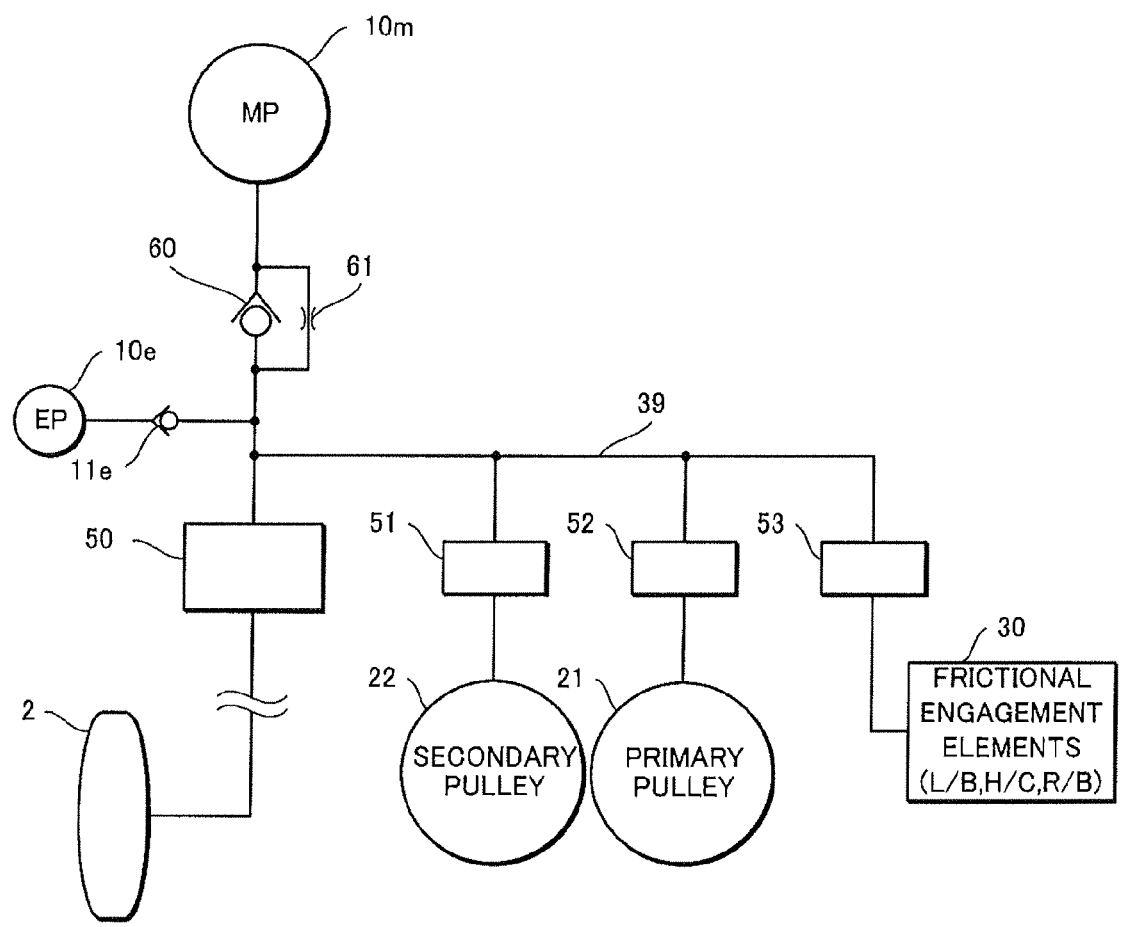
FIG. 8 is a diagram of a second embodiment centered on a hydraulic control circuit.

FIG. 8 is a diagram showing the second embodiment centered on a hydraulic control circuit 11.

In the first embodiment, the accumulator 40 is provided in the oil passage 39 to prevent the hydraulic pressure supplied from the mechanical oil pump 10*m* from becoming negative and the line pressure from decreasing due to the reverse rotation of the mechanical oil pump 10*m* caused by the reverse rotation of the engine 1.

Contrary to this, in the second embodiment, the check valve 60 is provided to prevent operating oil from being sucked by a mechanical oil pump 10*m* to reduce a line pressure when the mechanical oil pump 10*m* rotates in a reverse direction.

Specifically, the check valve 60 is provided between the mechanical oil pump 10*m* and an oil passage 39 connected to the mechanical oil pump 10*m* and between all components connected to the oil passage 39 and the mechanical oil pump 10*m*.

By this, when a hydraulic pressure generated by the mechanical oil pump 10*m* falls below the line pressure in the oil passage 39, the oil passage 39 and the mechanical oil pump 10*m* can be immediately cut off by the check valve 60 to prevent a reduction of the line pressure.

Note that the check valve 60 includes a bypass path 61 which allows a reverse flow from the oil passage 39 to the mechanical oil pump 10*m* in this embodiment.

The mechanical oil pump 10*m* of this embodiment is a vane pump and so constructed as to discharge the operating oil at a predetermined pressure by changing the volume of a cylinder by a vane provided on a rotating rotor.

The vane projects from the rotor to be pressed against the inner wall of the cylinder by a discharge pressure, thereby generating a hydraulic pressure. Thus, when the mechanical oil pump 10*m* rotates in the reverse direction and the discharge pressure becomes negative, the pressure for causing the vane to project decreases and the operating oil cannot be discharged (this is called "vane drop"). Even if the mechanical oil pump 10*m* rotates in the forward direction again, it takes time to generate the hydraulic pressure in a state of the vane drop.

In this embodiment, in order to prevent the vane drop when the mechanical oil pump 10*m* rotates in the reverse direction, the bypass path 61 is provided to supply the hydraulic pressure from the oil passage 39 to supply a minimum hydraulic pressure to the discharge side of the mechanical oil pump 10*m*. Note that an orifice is formed in the bypass path 61 so that the line pressure in the oil passage 39 does not suddenly decrease even if the mechanical oil pump 10*m* rotates in the reverse direction.

Although it has been described that the check valve 60 is provided between the mechanical oil pump 10*m* and the oil passage 39, the following construction may also be employed.

Figure 9:
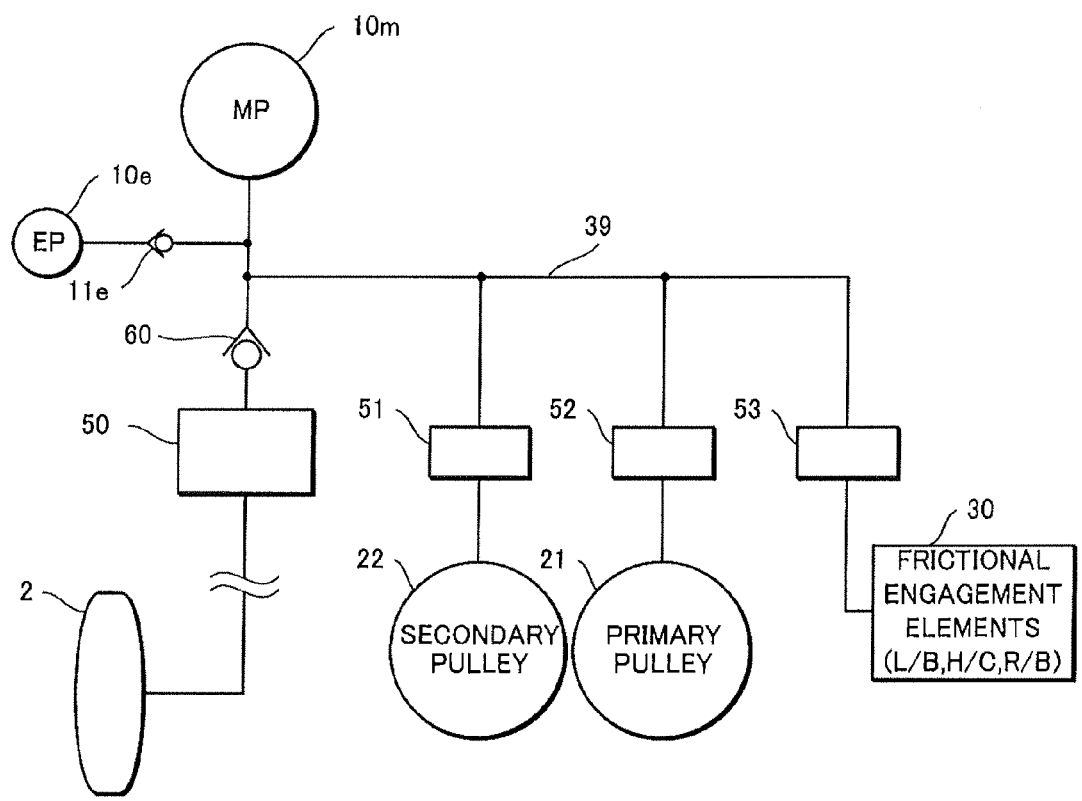
FIG. 9 is a diagram of a modification of the second embodiment centered on the hydraulic control circuit.

FIG. 9 is a diagram of a modification of the second embodiment centered on the hydraulic control circuit 11.

In the modification shown in FIG. 9, the check valve 60 is provided between the mechanical oil pump 10*m* and a torque converter 2 connected to the oil passage 39 via a line pressure regulator valve 50.

This can prevent a reduction of the hydraulic pressure supplied to the torque converter 2 and prevent a problem in the operation of the torque converter 2 caused by the hydraulic pressure reduction.

Figure 10:
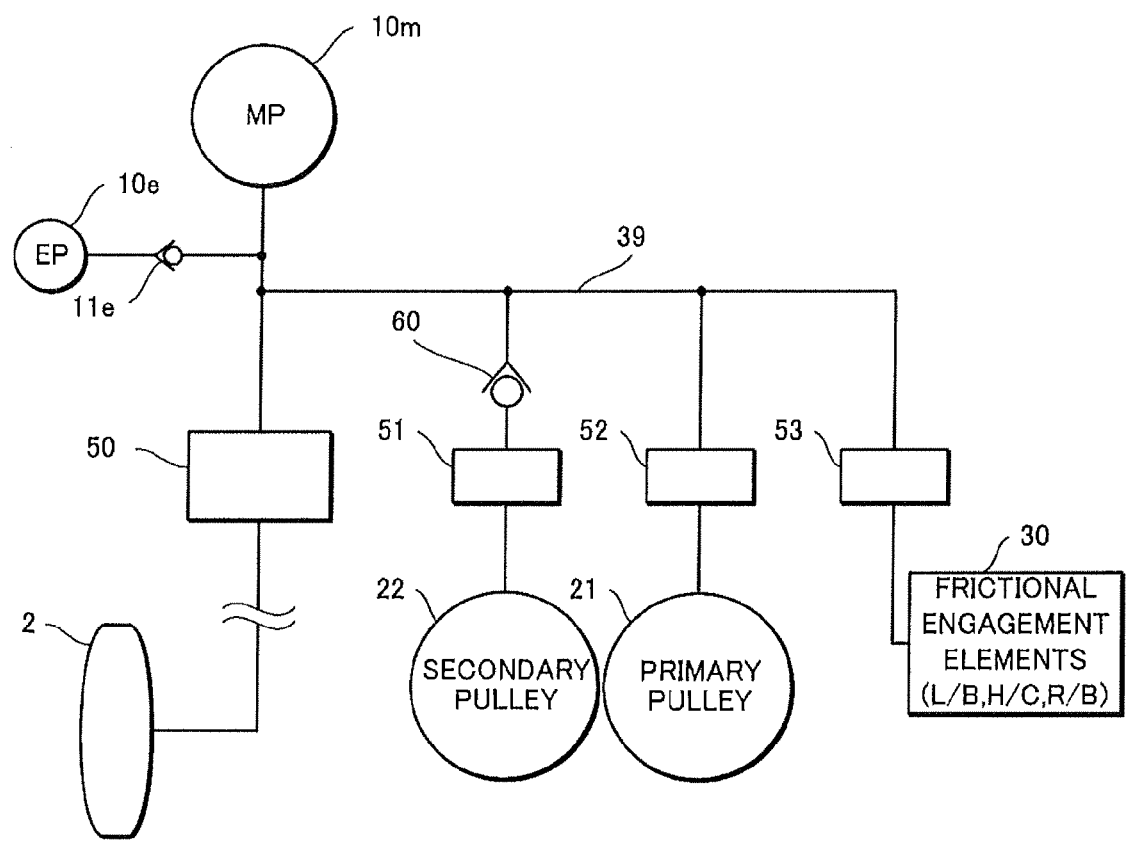
FIG. 10 is a diagram of another modification of the second embodiment centered on the hydraulic control circuit.

FIG. 10 is a diagram of another modification of the second embodiment centered on the hydraulic control circuit 11.

In the modification shown in FIG. 10, the check valve 60 is provided between the mechanical oil pump 10m and a secondary pulley 22 connected to the oil passage 39 via a pressure reducing valve 51.

This can prevent a reduction of the hydraulic pressure supplied to a hydraulic cylinder 23b of the secondary pulley 22, a reduction of a force for clamping the V-belt 23 at the secondary pulley 22 caused by the hydraulic pressure reduction, and abrasion and damage of the V-belt 23 due to the slip of the V-belt 23.

Figure 11:
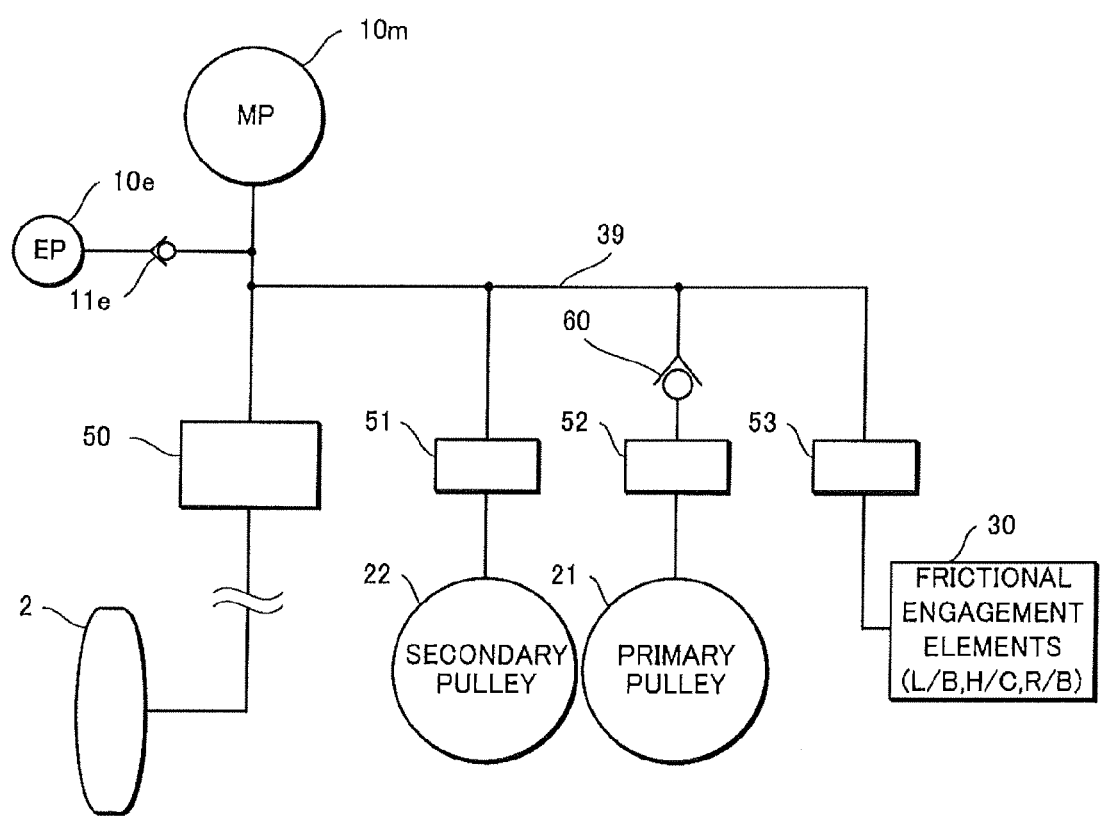
FIG. 11 is a diagram of still another modification of the second embodiment centered on the hydraulic control circuit.

FIG. 11 is a diagram of still another modification of the second embodiment centered on the hydraulic control circuit 11.

In the modification shown in FIG. 11, the check valve 60 is provided between the mechanical oil pump 10m and a primary pulley 21 connected to the oil passage 39 via a pressure reducing valve 52.

This can prevent a reduction of the hydraulic pressure supplied to a hydraulic cylinder 23a of the primary pulley 21, a reduction of a force for clamping the V-belt 23 at the primary pulley 21 caused by the hydraulic pressure reduction, and abrasion and damage of the V-belt 23 due to the slip of the V-belt 23.

Figure 12:
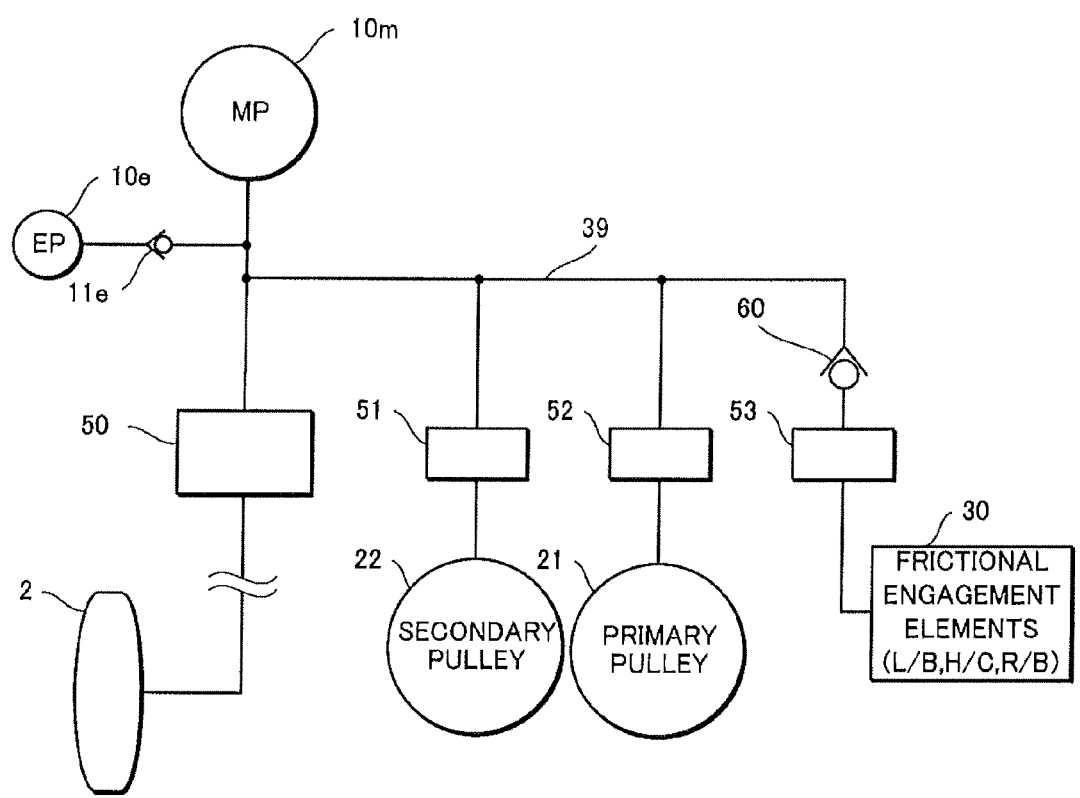
FIG. 12 is a diagram of further another modification of the second embodiment centered on the hydraulic control circuit.

FIG. 12 is a diagram of further another modification of the second embodiment centered on the hydraulic control circuit 11.

In the modification shown in FIG. 12, the check valve 60 is provided between the mechanical oil pump 10m and frictional engagement elements (low brake 32, high clutch 33, reverse brake 34) of a sub-transmission mechanism connected to the oil passage 39 via a pressure reducing valve 53.

This can prevent a reduction of the hydraulic pressure supplied to the frictional engagement elements of the sub-transmission mechanism 30, a reduction of the engaging force of the frictional engagement element caused by the hydraulic pressure reduction, and abrasion and damage of the frictional engagement elements caused by the slip of the frictional engagement elements.

Although one check valve 60 is provided in any one of these construction examples shown in FIGS. 9 to 12, a plurality of check valves 60 may be used in combination without being limited to this. For example, the check valve 60 shown in FIG. 9, the check valve 60 shown in FIG. 10 and the check valve 60 shown in FIG. 11 may be respectively provided at three positions. Although the construction examples shown in FIGS. 9 to 12 include the check valve 60, one or more accumulators 40 may be provided in place of the check valve 60.

If the check valves 60 or the accumulators 40 are provided at a plurality of positions, the number of components increases and a control valve for the control becomes larger in size. Accordingly, it is preferable to provide only one check valve 60 or accumulator 40 in the oil passage 39. This can suppress an increase in the number of components and the enlargement of the control valve.

As described above, in the second embodiment, the check valve 60 is provided in the oil passage 39 to prevent the hydraulic pressure supplied from the mechanical oil pump 10m from becoming negative and the line pressure from decreasing due to the reverse rotation of the mechanical oil pump 10m caused by the reverse rotation of the engine 1.

Thus, even if the mechanical oil pump 10m rotates in the reverse direction due to the reverse rotation of the engine 1 and the hydraulic pressure supplied from the mechanical oil pump 10m becomes negative, it can be prevented by the check valve 60 that the operating oil flows back to the mechanical oil pump 10m to reduce the line pressure. This can not only prevent the frictional engagement element of the transmission 4 and the V-belt 23 of the variator 20 from slipping due to a reduction of the engaging pressure of the frictional engagement element and the clamping pressure of the V-belt 23 and a sense of incongruity from being given to a driver such as by engine runup, but also prevent abrasion and damage of the frictional engagement elements and the variator 20.

The check valve 60 includes the bypass path 61 that allows the reverse flow from the oil passage 39 to the mechanical oil pump 10m. Since this can prevent the discharge pressure from becoming negative due to the reverse rotation of the mechanical oil pump 10m and prevent the vane drop of the mechanical oil pump 10m that is a vane pump, the hydraulic pressure can be immediately generated when the mechanical oil pump 10m comes to rotate in the forward direction again.

The embodiments of the present invention have been described above. The above embodiments are merely illustrations of application examples of the present invention and not of the nature to limit the technical scope of the present invention to the specific constructions of the above embodiments.

Although the electrical oil pump 10e is provided to ensure the line pressure at the time of a coast stop in the above embodiments, the electrical oil pump 10e may not always be provided. Even if the electrical oil pump 10e is not provided, the hydraulic pressure supplied from the mechanical oil pump 10m does not immediately decrease even when the operation of the mechanical oil pump 10m stops and the supply of the hydraulic pressure to the frictional engagement elements and the pulleys stops due to the coast stop. Thus, the line pressure for the engaging force of the frictional engagement element and the belt clamping force can be ensured for a predetermined time after the start of the stopped state of the engine 1. Therefore, the engine can be stopped for the predetermined time before the vehicle speed becomes zero and fuel economy can be improved.

In the construction including the electrical oil pump 10e, the line pressure for the engaging force of the frictional engagement element and the belt clamping force can be ensured by generating the hydraulic pressure even after the mechanical oil pump 10m stops. Thus, the time during which the engine 1 can be stopped due to the coast stop can be further extended, and fuel economy can be further improved as compared with the construction not including the electrical oil pump 10e.

Although the transmission 4 includes the variator 20 and the sub-transmission mechanism 30 whose speed ratios are controlled by the hydraulic pressure generated by the mechanical oil pump 10m in the above embodiments, the present invention is not limited to such a construction. The present invention can be applied for the purpose of preventing a reduction of a hydraulic pressure generated by a mechanical oil pump 10m in a hydraulic control device in which the mechanical oil pump 10m is driven by a driving force source and may possibly rotate in a reverse direction when the driving force source stops.

Although the belt-type continuously variable transmission mechanism is provided as the variator 20 in the above embodiments, the variator 20 may be a continuously variable transmission mechanism in which a chain belt is mounted between the pulleys 21 and 22 instead of the V-belt 23. Alternatively, the variator 20 may be a toroidal-type continuously variable transmission mechanism in which an inclinable power roller is arranged between an input disk and an output disk.

Although the sub-transmission mechanism 30 is a transmission mechanism with two forward gear positions, i.e. the first and second gear positions in the above embodiments, it may be a transmission mechanism with three or more forward gear positions. Further, although the transmission includes the sub-transmission mechanism 30 and the variator 20 in the above embodiments, it may include only a stepped transmission mechanism or only a variator.

Although the sub-transmission mechanism 30 is constructed using the Ravigneaux-type planetary gear mechanism, it is not limited to such a construction. For example, the sub-transmission mechanism 30 may be constructed by combining a normal planetary gear mechanism and frictional engagement elements or may be constructed by a plurality of power transmission paths including a plurality of gear trains with different gear ratios and frictional engagement elements for switching these power transmission paths.

Although the hydraulic cylinders 23*a*, 23*b* are provided as actuators for displacing the movable conical plates of the pulleys 21, 22 in the axial directions, the actuators are not limited to hydraulically driven ones and may be electrically driven.

This application claims priority from Japanese Patent Application No. 2010-203466, filed Sep. 10, 2010, which is incorporated herein by reference in its entirety.

What is claimed is:

1. A hydraulic control device, comprising:
a vane pump configured to generate a hydraulic pressure by being rotated by power of an engine of a vehicle;
an electrical oil pump configured to generate the hydraulic pressure by being driven by power from a battery;
a line pressure oil passage in which at least a line pressure generated by adjusting the hydraulic pressure generated by the vane pump is supplied;
an engine stopping unit that stops the rotation of the engine; and
a hydraulic pressure reduction suppressing unit that is provided in the line pressure oil passage and suppresses a reduction of the line pressure accompanying reverse rotation of the engine when the rotation of the engine is stopped by the engine stopping unit, wherein:
the vane pump generates the hydraulic pressure by being rotated by power of the engine;
the engine stopping unit stops the rotation of the engine while the vehicle is running;
the hydraulic pressure reduction suppressing unit comprises a check valve configured to suppress a reverse flow of the line pressure in the line pressure oil passage to the vane pump, and
the check valve comprises a bypass path which allows a reverse flow of the line pressure in the line pressure oil passage to the vane pump.

2. The hydraulic control device according to claim 1, wherein:
the hydraulic control device supplies the line pressure to an automatic transmission;
the automatic transmission comprises a transmission mechanism configured to transmit rotation of a plurality of rotation elements by a hydraulic pressure controlled based on the line pressure serving as a source pressure; and
the check valve is provided in a hydraulic circuit between the transmission mechanism for transmitting the rotation of the rotation elements and the vane pump.

3. The hydraulic control device according to claim 2, wherein the transmission mechanism is a continuously variable transmission mechanism which comprises a pair of pulleys and a belt mounted on the pair of pulleys and whose speed ratio can be changed by changing a groove width of the pulleys.

4. The hydraulic control device according to claim 2, wherein the transmission mechanism is a stepped transmission mechanism whose speed ratio can be switched by engaging and releasing a plurality of frictional engagement elements for transmitting the rotation of the rotation elements.

5. A hydraulic control device, comprising:
a vane pump configured to generate a hydraulic pressure by being rotated by an engine of a vehicle;
an electrical oil pump configured to generate the hydraulic pressure by being driven by power from a battery;
a line pressure oil passage in which at least a line pressure generated by adjusting the hydraulic pressure generated by the vane pump is supplied;
engine stopping means for stopping the rotation of the engine;
hydraulic pressure reduction suppressing means for being provided in the line pressure oil passage and for suppressing a reduction of the line pressure accompanying reverse rotation of the engine when the rotation of the engine is stopped by the engine stopping means, wherein:
the vane pump generates the hydraulic pressure by being rotated by power of the engine;
the engine stopping means stops the rotation of the engine while the vehicle is running;
the hydraulic pressure reduction suppressing means comprises a check valve for suppressing a reverse flow of the line pressure in the line pressure oil passage to the vane pump, and
the check valve comprises a bypass path which allows a reverse flow of the line pressure in the line pressure oil passage to the vane pump.

6. The hydraulic control device according to claim 5, wherein:
the hydraulic control device supplies the line pressure to an automatic transmission;
the automatic transmission comprises a transmission mechanism configured to transmit rotation of a plurality of rotation elements by a hydraulic pressure controlled based on the line pressure serving as source pressure; and
the check valve is provided in a hydraulic circuit between the transmission mechanism for transmitting the rotation of the rotation elements and the vane pump.

7. The hydraulic control device according to claim 6, wherein the transmission mechanism is a continuously variable transmission mechanism which comprises a pair of pulleys and a belt mounted on the pair of pulleys and whose speed ratio can be changed by changing a groove width of the pulleys.

8. The hydraulic control device according to claim 6, wherein the transmission mechanism is a stepped transmission mechanism whose speed ratio can be switched by engaging and releasing a plurality of frictional engagement elements for transmitting the rotation of the rotation elements.

* * * * *